May 7, 1946.   R. HARTE   2,399,802
METHOD OF MAKING TOOL BLADES
Filed Jan. 14, 1944
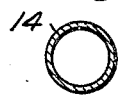
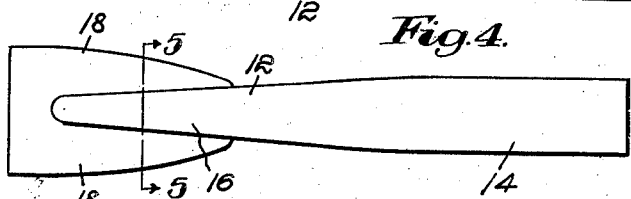
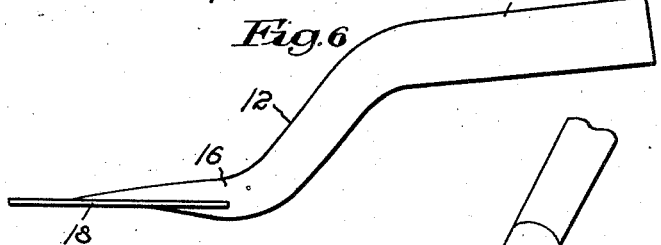
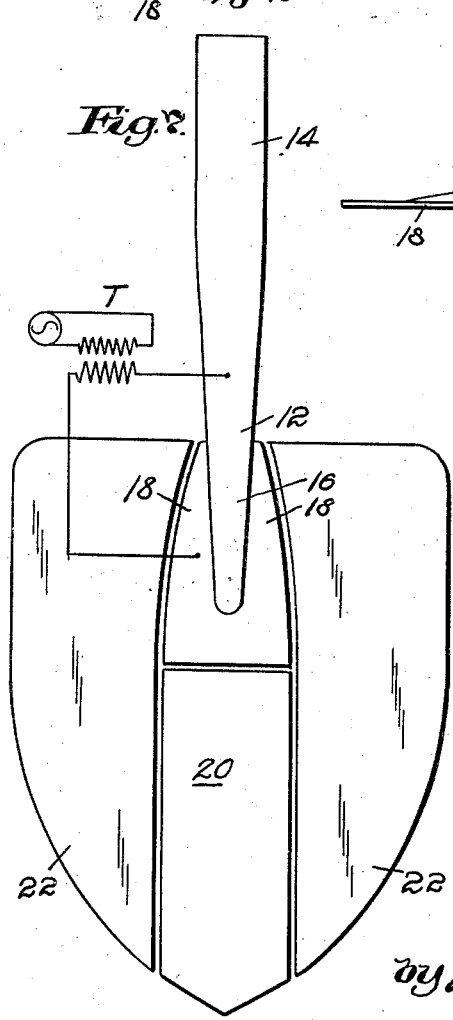
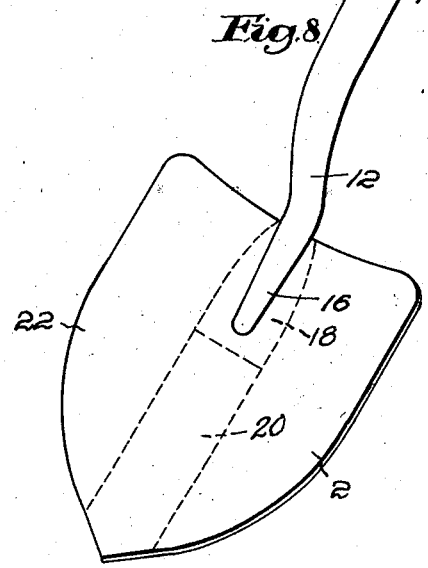

Patented May 7, 1946

2,399,802

UNITED STATES PATENT OFFICE 2,399,802

METHOD OF MAKING TOOL BLADES

Richard Harte, Parkersburg, W. Va., assignor to Ames Baldwin Wyoming Co., Parkersburg, W. Va., a corporation of Delaware Application January 14, 1944, Serial No. 518,302

2 Claims. (Cl. 76—113)

This invention relates to tools of the type having a broad, relatively thin blade or head and a manipulating handle. Garden hoes and shovels are examples and the tools may, for present purposes, be generically termed agricultural tools although obviously not always used for handling arable earth. Coordinate objects of the invention are to provide a strong and simple blade construction for such tools and an inexpensive and rapid method for producing the same.

If we consider, for example, a typical hoe of good quality, it will be seen that the wide body portion of the blade has projecting from the back thereof a stem portion providing for its union with a handle in a joint of the plug and socket type, in the case of the shank type of hoe being the male element or plug, and in the case of the socket type of hoe the female element or socket. At the end of this stem where it joins the blade it merges into a frog by which the broad, thin body of the blade, usually of substantially uniform thickness, is secured. For convenience I shall term this major portion of the blade the "palm," distinguishing it from the frog which forms a part or an integral part of the blade as such. The frog provides a relatively thick portion at the rear of the blade which may be wider than the shank and extends forwardly a substantial distance toward the working edge of the blade, usually tapering in thickness, and is designed to provide a strong connection of the blade to the handle and to distribute the strains of use over a wide area of the palm. In a forged hoe or in a shovel of the solid shank type the palm, frog and handle-attaching stem are forged and rolled form a unitary blank having initially a very slight similarity to the finished article.

With the modern development of fusion welding many proposals have been made to apply it to the manufacture of the blades of agricultural tools. Seam welding has been extensively and practically used for the manufacture of shovels of the plain back type to secure the head of the front strap to the rear face portion of the blade, as was formerly done by the blacksmith's hammer weld. Various proposals for securing together a blade proper or palm to a stem portion by edge to edge butt welding or by arc welding as hitherto made have been found to offer certain difficulties in practice and have not come into general use. It has also been proposed to provide a handle-receiving socket with a tubular wall circumferentially unbroken, as in the solid shank type of shovel, by utilizing a length of preformed tube. These proposals also have not been found practically serviceable in the art.

Without attempting in this place to define the scope of the invention, that being reserved for the claims in accordance with the statute, it may facilitate the understanding of the following description if I here epitomize the subject matter thereof as the disclosure of a shovel having a socket and hollow frog formed from a tubular element such as a length of unitary seamless tubing by forging the end of the element to provide a hollow frog and laterally projecting portions of relatively small area integral with the walls thereof, in which area the tube is completely flattened and having the blade completed by a plurality of palm-forming elements united by electric butt welding to the margins of such end portion and among themselves.

In the accompanying drawing, wherein there is shown by way of example an illustrative embodiment of the invention:

Fig. 1 is a longitudinal section of a tube;

Fig. 2 is an end view thereof;

Fig. 3 is a longitudinal section showing the result of an initial treatment of the tubular blank of Fig. 1;

Fig. 4 is a plan view of the same part after further manipulation;

Fig. 5 is an enlarged section on the line 5—5 of Fig. 4;

Fig. 6 is a side elevation showing the element of Fig. 4 cranked or bent;

Fig. 7 is a plan view showing the various parts which go up to make the shovel blade grouped; and Fig. 8 is a perspective of the completed shovel.

The construction of my improved shovel will be perhaps most readily understood from a description of the method of manufacture.

Referring to Figs. 1 and 2, I there show a short section of tubing from which the handle-receiving socket and the frog of the blade are formed. For example this tube might be of 16 gauge steel with an internal diameter of about 1¼ inches, although the dimensions are not in any way critical.

Desirably I treat the tube at an intermediate point nearer one end thereof to reduce the diameter with concomitant thickening of the wall, as indicated at the point 12. This may be effected by the swaging process whereby the tool is subjected to a multiplicity of rapidly repeated blows. There is thus provided at the right-hand end, viewing Fig. 3, a tubular portion 14 which forms the handle-receiving socket in the completed shovel which has a tapered interior bore and a wall of gradually increasing thickness toward the point 12. This reduction of diameter of the socket is chiefly for reasons of appearance in the completed shovel.

The left-hand portion of the blank as it appears in Fig. 3 is then acted on by a suitable forging die to crush together the walls of the cylinder at the extremities of a diametral plane corresponding to the plane of the paper in Fig. 3 and along lines converging toward the left, thus to define a central hollow frog 14 which is generally arrowhead-shaped in plan and lenticular in section, as seen in Fig. 5. Successive sections of the portion 16 would be of progressively less depth as we advanced toward the left in Fig. 4. The walls of the tube lateral to this frog are pressed together into contact and define lateral areas 18. Preferably as shown in Fig. 5 the die is so formed that the double thickness or fold at the margins of these areas is thinned or tapered more nearly to approximate it to the thickness of the parts 22 hereinafter to be described which are to be attached thereto. Any flash in the forging operation may be trimmed away, leaving the part as shown in Fig. 4.

To provide a shovel the part may be bent to the form shown in Fig. 6 to provide the desired lift to the shovel.

To complete the blade a strip of metal 20 has its rear edge butt welded to the flattened end of the tube adjacent the point of the frog 16, this being diagrammatically illustrated in Fig. 7 by the showing of the transformer T, the parts being shown positioned adjacent each other ready to be advanced together along a vertical line, viewing the figure, to effect the welding operation by interfusion of the edges with a certain burning away of the metal. The strip 20 is of such length as to extend to the working edge of the blade and provides the central zone of the palm of the shovel. The palm is completed by lateral portions 22 which may be cut from sheet steel of substantially the desired finished thickness of the blade and which are joined by butt welding to the laterally presented edges or margins of the parts 18 and the strip 20.

The blade with the parts which are shown separated in Fig. 7 joined in this manner may then be concaved or otherwise suitably shaped and the shovel is completed by the attachment of a handle 24 in the socket 14. In Fig. 8 the lines of butt welding are indicated in conventional manner by dotted lines.

The central strip 20 may be somewhat heavier than the lateral elements 22 and, if desired, may be of different material. Thus it might be of alloy steel providing a durable wearing point for a round edge shovel of the type shown and strength along the central portion of the blade where the strain is greatest. By suitably shaping the strip 20 a desired portion of the edge of the blade may be formed thereby.

It will be noted that all rolling operations are dispensed with. The socket and frog of the shovel may be made from a simple length of tube. The use of forging dies to form the end of the tube in the manner shown in Fig. 4 ensures uniformity of result. The butt welds may be easily and effectively made as they involve simply the opposition of two elements which may be advanced into contact with each other to interfuse. The whole manufacturing operation is easily and inexpensive and the resulting shovel is light by virtue of the hollow frog and hollow shank at the point 12, yet very strong.

I am aware that the invention may be embodied in other specific forms without departing from the spirit or essential attributes thereof, and I therefore desire the present embodiment to be considered in all respects as illustrative and not restrictive, as is in fact clear in several matters from the description itself. Reference is to be had to the appended claims to indicate those principles of the invention exemplified by the particular embodiment described and which I desire to secure by Letters Patent.

I claim:

1. The method of forming a blade for an agricultural or like tool which comprises forging the end portion of a tube to crush it at the extremities of a diametrical plane and along forwardly converging lines to provide a hollow frog arrow-shaped in plan and extensions at either side thereof wherein the walls of the tube are pressed flat together, butt welding a strip endwise to said end portion to provide the central portion of the palm of the blade to the edge thereof, and butt welding the edges of lateral palm-completing pieces to the laterally presented sides of said extensions and strip.

2. The method of forming a blade for an agricultural tool which comprises operating on an intermediate portion of a length of tube to provide a neck of reduced diameter and relatively thick wall, one end of the tube providing a handle-receiving socket, forging the other end of the tube to crush it at the extremities of a diametrical plane and along forwardly converging lines to provide a hollow frog arrowhead-shaped in plan and extensions at either side thereof wherein the walls of the tube are pressed flat together, and butt welding the edges of a plurality of elements to the margins of said end portion to provide the palm of the blade.

RICHARD HARTE.